Figure 1:

Oct. 8, 1935.  W. A. TRYON  2,016,758
AUTOMOTIVE SPRING SHACKLE LINK
Filed July 17, 1931  3 Sheets-Sheet 1

INVENTOR
William A. Tryon
BY
ATTORNEYS

WITNESS

Oct. 8, 1935.  W. A. TRYON  2,016,758

AUTOMOTIVE SPRING SHACKLE LINK

Filed July 17, 1931  3 Sheets-Sheet 2

INVENTOR
William A. Tryon.

WITNESS

BY
ATTORNEYS

Oct. 8, 1935.   W. A. TRYON   2,016,758
AUTOMOTIVE SPRING SHACKLE LINK
Filed July 17, 1931   3 Sheets-Sheet 3
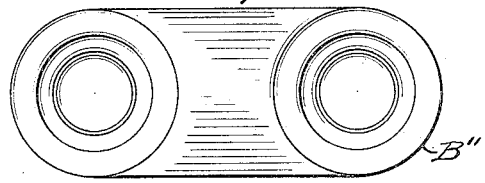
Fig. 7.
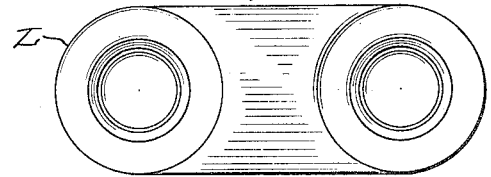
Fig. 10.
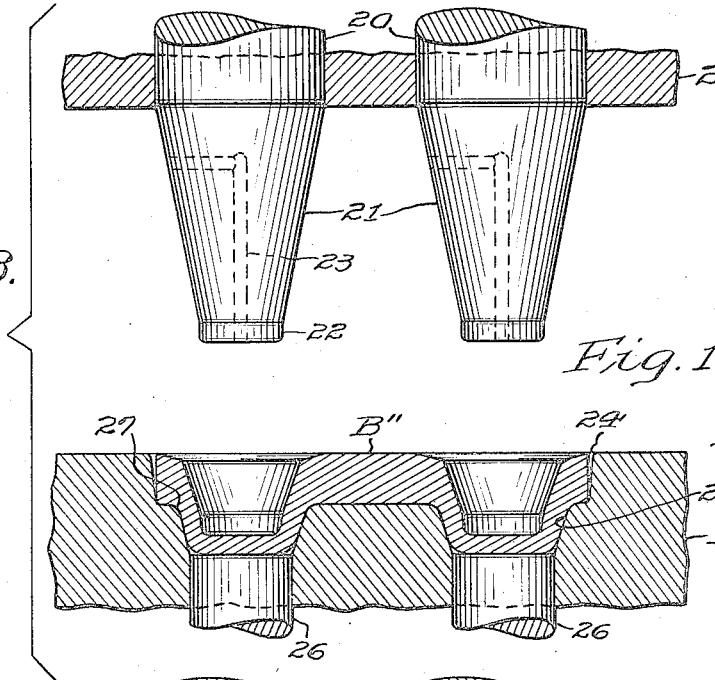
Fig. 8.
Fig. 9.
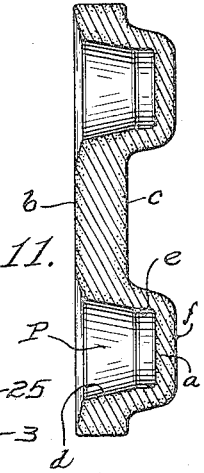
Fig. 11.
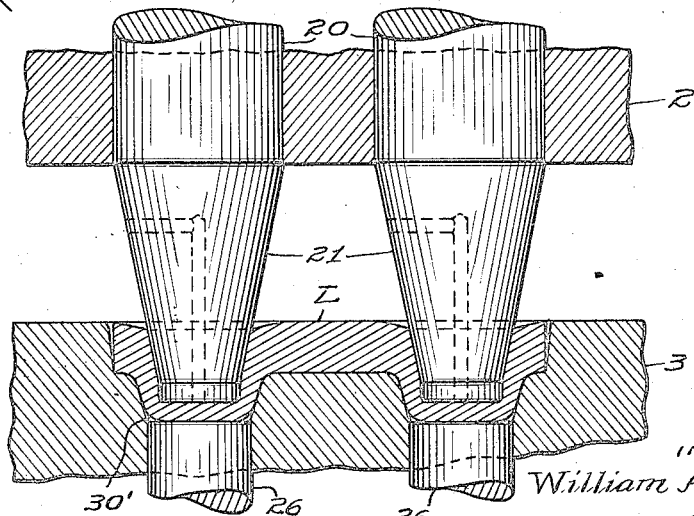
INVENTOR
William A. Tryon.
WITNESS
F. J. Hartman.
BY
ATTORNEYS Patented Oct. 8, 1935

2,016,758

UNITED STATES PATENT OFFICE 2,016,758

AUTOMOTIVE SPRING SHACKLE LINK

William A. Tryon, Elmira, N. Y., assignor to Trayer Products Incorporated, Elmira, N. Y., a corporation of New York Application July 17, 1931, Serial No. 551,328

4 Claims. (Cl. 267—54)

The link of my invention is adapted for use in those forms of shackles which embody transversely extending pins having conical ends seating in correspondingly generally conical apertures or depressions in the side links which are constantly urged toward each other, and thus maintained in bearing engagement with the pins, by suitable resilient means preferably associated with a single bolt arranged to hold the side links in assembled position on the pins, a shackle of this general type forming the subject of U. S. Patent 1,534,193, granted to me on April 21, 1925.

In the preferred commercial form of shackle link adapted for assembly in a shackle of the class to which I have just referred, the bottoms of the pockets intended for the reception of the ends of the pins are closed, instead of being open as shown in my said patent, so as to cover the adjacent ends of the pins although leaving a suitable clearance between said bottoms and the extremities of the pins, while the walls of the pockets adjacent their bottoms or inner ends are arranged to extend parallel to the central axes of the pockets instead of being inclined thereto in order that the adjacent end of each pin may project beyond the conical bearing surface formed by the pocket wall and thus prevent the formation of a shoulder therein as the said bearing surface and that of the pin gradually wear together. It is moreover necessary that each side link as a whole must be of sufficient strength to withstand the duties imposed upon it when assembled in the shackle and the shackle in turn assembled in the automobile of which it forms a component part, and that the conical pockets adjacent the opposite ends of the side link designed for the reception of the correspondingly coned ends of the shackle pins must be very accurately formed as to size and taper so as to properly receive and form adequate bearing surfaces for the ends of the pins.

In the commercial manufacture of such links it has heretofore been customary to form them by drop forging, an operation which, while producing an entirely satisfactory article, is relatively expensive with consequent increase in the cost of the shackle as a whole.

It is an object of the present invention, therefore, to provide a side link adapted for employment in a spring shackle of the general class to which I have referred which may be manufactured on a production basis in large quantities with a minimum expenditure of time and labor and at a much lower cost and with greater rapidity than the drop forged links heretofore employed yet which is equally, and in some cases even more, satisfactory than the latter.

A further object of the invention is the provision of a novel method of forming shackle side links of the character of those to which the invention relates and by means of which the links may be produced accurately, economically and at a high rate of speed.

Other objects, advantages, novel steps and features comprehended by my invention are hereinafter more specifically pointed out or will be apparent to those skilled in the art from the following description of a side link produced in conformity with the method forming a part of the invention.

As hitherto stated, although it has been customary to drop forge side links of the class to which the present invention relates, I have found they may be satisfactorily produced by a cold drawing or stamping operation as hereinafter described. In this way, all heating of the blank from which the link is formed is avoided as, in accordance with my invention, the blank is merely acted upon while cold by suitable dies disposed in and actuated by a punch press or the like of sufficient size and strength to perform the necessary operations. By the use of suitable transfer mechanism for moving the blank progressively from one station to the other in the press as the various operations incident to reducing it to the desired contour are consecutively performed upon it, all handling of the blank from the time of its introduction to the press until it emerges therefrom as a finished link, insofar as the formation of the pockets is concerned, may be avoided and when, as is preferable, the blanks are automatically and consecutively fed into the press from a hopper or the like by suitable feeding machinery forming no part of the present invention, substantially all manual labor in the production of the links may thus be entirely dispensed with.

In order to meet the commercial requirements to which I have referred, the link must be of sufficient strength to withstand the duties imposed upon it and when made of cold rolled steel, as is ordinarily the case, is therefore usually formed from stock at least $\frac{5}{16}$" in thickness, while to afford the requisite bearing area for the ends of the pins, the pockets should normally approximate $\frac{5}{8}$" in depth and $\frac{3}{4}$" in diameter at their larger or inner ends. It will thus be apparent that the depth of the pockets is approximately twice that of the thickness of the stock or blank from which the link is produced and thus, when the latter is formed in accordance with the present invention, it becomes necessary to displace from the body of the blank sufficient metal to provide on the side of the blank opposite that in which the larger end of each pocket terminates, a boss or projection of proper size to surround the inner or smaller end of the pocket and of sufficient wall thickness to afford suitable protection to the adjacent extremity of the pin when the parts are assembled. As will hereafter more fully appear, the metal required for the formation of this boss is substantially equivalent in volume to that displaced from between the upper and lower parallel faces of the blank.

In the performance of the method of my invention a blank of suitable size and shape and having substantially parallel upper and lower faces is progressively subjected to the action of a series of dies which, by their sequential operations on the blank, transform it to the ultimately desired shape, and since each side link comprises two of the pockets to which I have referred respectively disposed adjacent the ends of the blank, the dies are preferably so constructed as to operate on both ends of the blank simultaneously, each die thus comprising, generally speaking, a pair of punches and a pair of cups respectively aligned therewith and in which the metal displaced by the punches is received. Moreover, with a view to expediting production, the several dies are desirably arranged in a single press provided with a suitable transfer mechanism operative to move the blank with a step by step motion from one die to the next, so that at each stroke of the press a plurality of blanks will be respectively acted on by the several dies, a fresh blank being introduced to the first set of dies and a finished link being ejected from the last set at the opposite end of the press between each of its working strokes. Normally, three sets of dies are required for properly forming the link, and it is thus apparent that under these conditions three strokes of the press will be required for each blank passing through it. The press may be of any suitable form as long as it is adapted to effect the requisite movements of the dies, but must of necessity be capable of exerting tremendous power and of extremely rugged construction to avoid springing or disalignment with consequent inaccuracies in the work. Equally so, the transfer mechanism, if employed, may be of any type suitable for the performance of its intended function, and as neither the press, the transfer mechanism nor the blocks in which the dies are held constitute any part of the present invention, illustration thereof in the accompanying drawings is omitted save only as portions of the die blocks are fragmentarily shown. Moreover, for convenience of illustration, I have shown each of the several sets of dies independently and without regard to their assembled relation with the adjacent set, although it will be understood that normally all of the die punches are supported in a single vertically movable die block of suitable form with the cups or depressions forming the female portions of the dies disposed therebelow in suitable alignment with the punches which are suitably spaced along the path traversed by the blank as it passes through the press.

Figure 2:
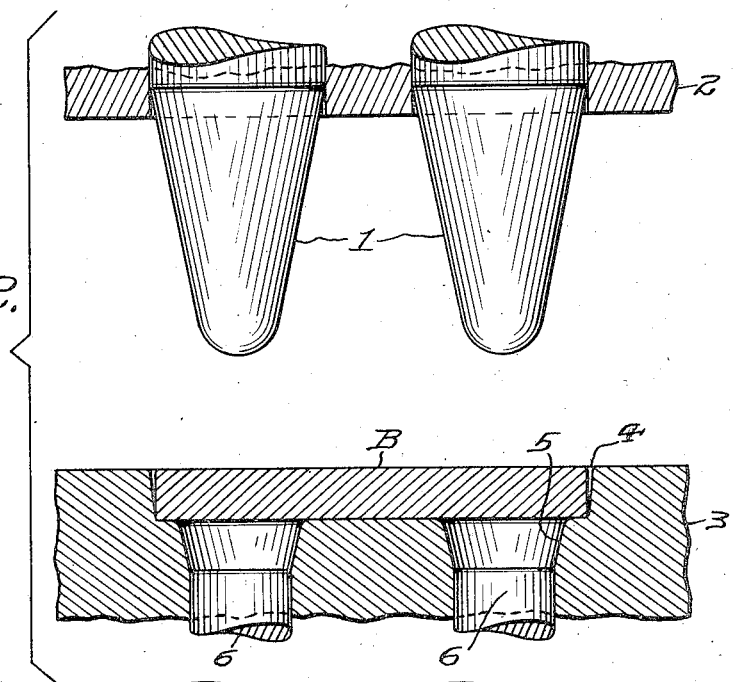
Figure 3:
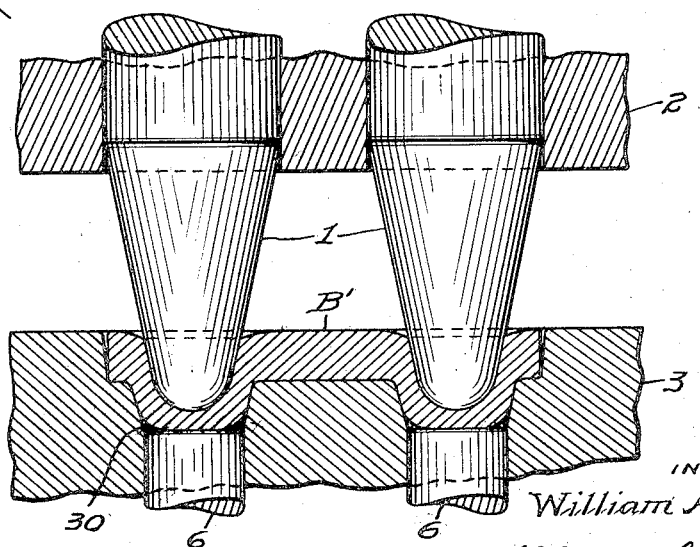
Figure 4:
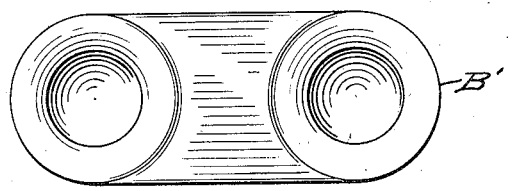
Figure 5:
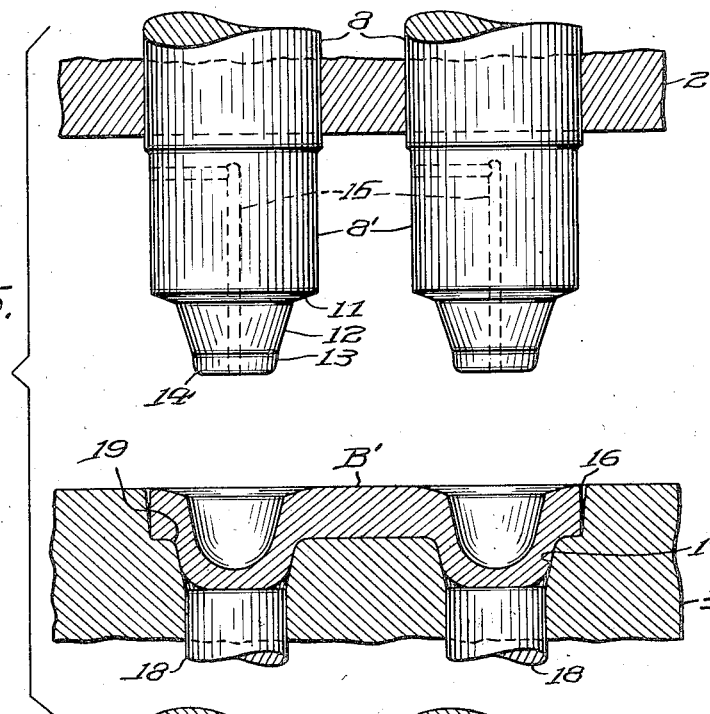
Figure 6:
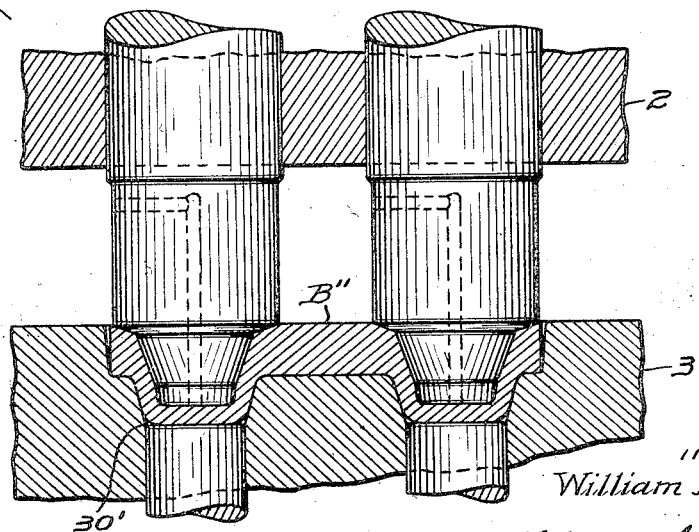

Referring now to the drawings, Fig. 1 is a plan view of the blank preparatory to its introduction to the press in which the dies are disposed; Fig. 2 is a view partly in fragmentary vertical section and partly in elevation showing the dies disposed at the first station with the blank B in position to be acted on thereby, and Fig. 3 is a generally similar view showing the punches at the extremity of their downward movement and the appearance of the blank after it has been acted on thereby. Fig. 4 is a top plan view of the blank B' after removal from the dies at the first station and before being introduced to the dies at the second station which are shown in Fig. 5 in a manner generally corresponding to Fig. 1, while Fig. 6 shows the punches of the second set of dies at the extremity of their downward movement and the appearance of the blank after being acted on thereby. Fig. 7 is a top plan view of the blank B'' after removal from the dies at the second station and prior to introduction to those at the third station which are shown in Fig. 8 in a manner generally similar to Figs. 2 and 5, while Fig. 9, corresponding to Figs. 3 and 6, shows the punches of the third set of dies at the extremity of their downward movement as well as the appearance of the blank resulting therefrom. Fig. 10 is a top plan view of the finished blank or link L, and Fig. 11 a longitudinal central section thereof particularly designed to show the flow of the metal as a result of the operations to which the blank has been subjected. Like characters of reference are used to designate the same parts in the several figures.

I shall first refer more particularly to the construction of the dies and then to the series of operations incident to their use in transforming the flat blank B (Fig. 1) into the finished link L (Figs. 10 and 11), it being understood that by the term "finished link" it is intended to indicate a link provided with the requisite pockets and which requires no further work or operations insofar as the same are concerned to adapt it for assembly in the finished shackle. It will be understood, however, that prior to such assembly other operations are customarily performed on the link such, for example, as punching or otherwise forming a suitable hole for the passage of the bolt by which the opposed links are maintained in assembled relation in the shackle and the drilling and threading of the ends of the bosses in one link of each pair for the reception of Alemite or other fittings through which lubricant can be introduced to the interior of the hollow pins, but as these various operations form no part of the present invention, which is concerned solely with the production of a link having finished pockets adjacent its ends, a passing mention thereof is all that is required.

The first set of dies shown in Figs. 2 and 3 comprise a pair of similar punches I, I which are secured in a die block 2 with their axes spaced apart for the same distance at which it is desired that the axes of the pockets be spaced in the link; these punches are disposed in the same vertical plane and are movable with the die block as it is raised and lowered by the operation of the press. Beneath the punches is disposed a die plate 3 which is relatively fixed with respect thereto; this plate has in its upper surface a depression 4 of suitable shape and size to receive the blank B, and beneath each punch and extending below the bottom of the depression a circular opening 5 having a slightly inwardly and downwardly tapering wall. Each opening approximates in depth the thickness of the blank B and while, under certain circumstances, it may simply be cut in the die plate and the metal thereof thus permitted to form its bottom, I prefer to bore the die plate therebelow and dispose in the hole thus formed a vertically reciprocal plunger 6, the upper end of which extending normal to its axis thus forms a bottom for the opening 5 so that a cup or die of inverted hollow frusto-conical form is provided. The vertically movable plungers 6—6 are desirably so arranged as to be capable of movement upwardly from their normal position as just described, thus affording a convenient means of "knocking out" the formed blank from the die plate as a prerequisite to transfer to the next station by the transfer mechanism (not shown) which, as hitherto stated, may be of any desired character.

The punches 1, 1 are cylindrical in cross section and downwardly tapered toward their lower ends which are rounded as shown, the angle included between the tapered sides of the punches approximating 22½°. The punches are thus effective when forced into the blank to respectively form therein a downwardly tapering cavity having a symmetrically rounded bottom or inner end, the mouth of the cavity being of somewhat less diameter than the desired corresponding diameter of the finished pocket.

The second set of dies which are disposed at the second station are shown in Figs. 5 and 6 and, as in the case of the first set, comprise a pair of vertically aligned punches 8, 8 disposed in the die block 2 at the same distance apart as the punches 1, 1. The lower ends of these punches are, however, differently shaped from those of the first set as will be apparent from an inspection of Fig. 5. Thus, from the body of each punch which may at its lower part 8' be of slightly smaller diameter than at its upper, an annular shoulder 11 having its surface slightly angularly downwardly inclined is directed inwardly; beneath this shoulder the punch is tapered downwardly and inwardly as at 12 in general correspondence with, or with a taper slightly less than, the taper of the pin which is intended to be used with the side link, and beneath this main tapered portion is provided a short section 13 of considerably less taper or even cylindrical, the lower corner of this section being slightly rouned or filleted as at 14. The annular surfaces 11 are designed to true up to some extent the surface of the blank adjacent the depressions formed by the punches 1, as when they operate on the blank, as hereinafter more fully explained, the metal of the surrounding surface tends to flow inwardly and downwardly and thus takes an undesirable curve, as indicated in Fig. 3; the conical portions 12 are designed to form the walls of the pockets to approximately the shape and of slightly less diameter than ultimately desired, while the cylindrical or slightly tapered portions 14 are designed, to some extent at least, to shape up the hitherto curved surfaces at the bottom of the blank to a more nearly cylindrical form. Desirably, each punch 8 is provided with a passage 15 extending upwardly from its lower end and thence outwardly to its surface to serve as an air vent to prevent the trapping and compression of air between the punch and the blank when the former is forced home.

The die plate 3 is provided beneath each punch 8 with a depression 16 for the reception of the blank B' and with conical openings 17 generally corresponding to the openings 5 and closed at their lower ends by movable plungers 18 corresponding to the plungers 6 and operable to kick the formed blank out of the die plate. It will be noted that the corners 19 at the upper ends of the bores 17 are desirably rounded quite appreciably.

The third or final set of dies are shown in Figs. 8 and 9 and comprise a pair of punches 20, arranged similarly to those hitherto described, each of which tapers toward its lower end at substantially the same angle, desirably 22½°, as the punches 1, thus providing a conical surface or portion 21 adapted to smooth and finally finish the bearing surface of the pocket in the blank; below this conical portion is a short portion 22 which may be either cylindrical or very slightly downwardly tapered which is adapted to form a substantially cylindrical cavity or countersink adjacent the inner end of the pocket. As in the case of the punches 8, a passage 23 extending from the end of each punch and communicating with the surface of its conical part may be provided for a like purpose.

The subjacent die plate 3 is provided with a suitable depression 24 adapted to receive the body of the blank B" with openings 25 suitably disposed therebelow, having their walls inwardly inclined similarly to the openings 17 and closed at their bottoms by the vertically movable knock out plungers 26. Desirably the corners 27 at the upper ends of the bores 25 are rounded similarly to the corners 19.

All punches are finished very smoothly to the proper size and shape and are then preferably plated with chromium so as to reduce wear and facilitate their passage through the metal of the blank.

In the practice of the invention, the blanks B (Fig. 1) are first cut from suitable stock and preferably rolled to remove burrs and then stacked in a magazine from which they are fed one at a time to the depression 4 in the die plate below the punches 1, 1 while the latter are in raised position, as shown in Fig. 2. The punches are then caused to descend to the position shown in Fig. 3, thus forcing or extruding the metal of the blank which lies beneath them downwardly and outwardly from its lower face and forming adjacent each end of the blank a cavity corresponding in shape to the lower ends of the plungers. It will be noted that this operation displaces adjacent each punch a body of metal substantially equivalent in volume to that comprised in that portion of the punch lying below the upper face of the blank when the punch is at the bottom of its stroke and that the bulk of this metal is transferred into but does not entirely fill the cup or die formed by the opening 5 and plunger 6 since the capacity of the cup is so calculated that under ordinary working conditions an annular clearance or void 30 is left adjacent the bottom corner of the cup. The arrangement of the punches and dies so as to afford this clearance I have found in practice as absolutely essential, as in the absence thereof a slight increase in the thickness of the blank, due to inaccuracies in manufacture, which as a practical matter it is impossible to avoid, or an unusual adherence of the metal to the punches with consequent dragging down by the latter of a greater amount of metal than is normally displaced, results in more metal being crowded into the cup than it can hold with consequent breakage of the dies, strain on the press and the like. Since the external contour of the bosses formed by the displaced metal on the lower side of the blank and thus existing in the finished link is susceptible of a relatively considerable amount of variation without rendering the link unsuitable for its intended purpose as long as the inner surfaces of the pocket are properly sized and disposed in respect to its upper face, the fact that a smaller clearance 30 will be left when the blank is slightly thicker than it theoretically should be or if for some reason a somewhat excessive amount of metal has been dragged down by the punch, becomes of no moment, the result under these conditions merely being a slightly sharper corner on the boss in the finished link than is normally produced, the inner configuration of the pocket, however, remaining the same in all cases.

Following or substantially coincident with the ensuing upward movement of the punches, the formed blank B' is knocked upwardly by a vertical movement of the plungers 6 sufficiently to permit it to be transferred by the transfer mechanism to the depression 16 beneath the second set of punches as shown in Fig. 5 while a fresh blank B is positioned at the first station. Thereupon on the next down stroke of the press, punches 8, 8 are caused to descend on blank B' (and punches 1, 1 on blank B as well) so as to effect a radial stretching of the conical portions of the cavities formed by the punches 1, 1; to flatten the face of the blank adjacent the mouths of the cavities through coaction with the blank of the annular surfaces 11, and finally to transform the bottoms of the cavities to more nearly cylindrical shape through the medium of the cylindrical or slightly tapered portions 14 of the punches. The flat end faces of the punches also serve to flatten the bottoms of the cavities and to locate them at exactly the proper distance from the upper face of the blank. It will be noted from an inspection of Fig. 6 that the clearances 30' have been slightly reduced by the action of the punches 8, 8 but still exist to some extent under normal conditions. The blank B'' is then raised from the depression 16 by the plungers 18, 18 after the punches have been withdrawn and transferred to the depression 24 in the dies at the third station (while the succeeding blank B' is also transferred from the first to the second station and a fresh blank B disposed at the former) at which through the action of the punches 20, 20 the conical bearing surfaces of the pockets are finally sized and given the exact angle of inclination desired while the cylindrical countersink or chamber at the inner end of each pocket is similarly sized and shaped to its ultimately finished form, these operations involving some radial stretching of the cavities as well as a general squaring-up of the corners therein. The finished blank is now cleared from the third set of dies by the plungers 26 and ejected from the press by the transfer mechanism. It is then ready for any further operations, such as boring and threading the bosses for the "Alemite" fittings, punching the hole for the bolt, or the like, which may be required to make it ready for assembly in the shackle.

Mention has already been made of the desirability of plating the punches with chromium, after which they are preferably highly polished, as it has been found that in the absence thereof they tend to drag the metal of the blank down into the subjacent dies instead of going cleanly through it with resultant production of the smooth and highly finished surfaces required for the reception of the shackle pins.

It will thus be apparent that in accordance with my invention I am able to produce by a cold drawing operation with great rapidity and in a minimum of time, entirely satisfactory side links adapted for assembly in a shackle of the character to which I have referred, with consequent reduction in cost of the shackle as a whole and in turn of the automobile of which it forms a component part, and as the life of the dies and punches when the latter are plated with chromium is very great, thousands of links may be turned out from a single set thereof before the punches become unserviceable or so worn as to form pockets of less than desired size.

While the blanks from which the link is produced may be of any kind of steel adapted to flow satisfactorily under the action of the dies, I prefer to form them from what is commercially known as "rimmed steel" of a carbon content below 0.8 and not exceeding Brinnell 75 in hardness, a variety of steel in which the metal adjacent the upper and lower surfaces of the strip from which the blanks are punched is of somewhat different character from the center portions of the strip. When a blank of this kind of steel is formed into a side link in accordance with my invention and thereafter sawed in two longitudinally and etched, it is relatively easy to follow the flow of the metal during the drawing operation, and I have indicated it in Fig. 11. From an inspection of this figure it is to be noted that the metal which forms the bottom wall $a$ of each pocket P has been substantially bodily displaced downwardly but still maintains a characteristically different appearance adjacent its upper and lower faces although considerably decreased in thickness from the body of the blank; in other words, the metal which originally lay adjacent the surface $b$ now forms the upper part of the pocket bottom wall $a$ and that which originally lay adjacent the surface $c$ now forms the bottom part of said wall. Moreover, the ring of metal which originally surrounded that which now forms the bottom wall of the pocket is distributed over the upper part of the inclined inner bearing surface $d$ of the latter in a layer of gradually downwardly decreasing thickness which vanishes just above the straight portion $e$ of the pocket wall bounding the cylindrical countersink terminating at the bottom of the pocket. Presumably, when the blank is formed of steel other than rimmed steel, the flow and ultimate disposition of the metal during the drawing operation is substantially similar to that just described but of course cannot be as clearly discerned when the finished link is cut in two and etched as in the case of the rimmed steel blank because of the initial homogeneity of the metal throughout its body.

It will further be noted that the distance from the outer face $f$ of each boss to the plane of the under surface $c$ of the link is substantially equal to the original thickness of the blank and that the depth of the finished pocket is substantially twice that amount, and I believe that in the forming by a cold drawing operation of articles of the nature of my improved side link out of steel blanks necessarily as thick as that required to afford the ultimate requisite strength in the link, this is a distinctly novel result and something which has not heretofore been capable of accomplishment without fracture of or other injury to the metal.

While I have shown and described one embodiment of my improved side link with considerable particularity as well as the preferred method of forming it in accordance with the invention, it will be understood that changes may be made in the dimensions and/or proportions of the link as required for different commercial installations and in the details of the several operations incident to the said method, without departing from the spirit and scope of the invention as defined in the appended claims.

Having thus described my invention, I claim and desire to protect by Letters Patent of the United States:

1. A spring shackle side link comprising a flat steel body having adjacent each of its ends a portion of the metal extruded from the plane of the body to provide continuous walls integral therewith respectively defining a generally conical pocket extending entirely through the body and for an appreciable distance therebeyond, the material forming the conical walls of said pocket being stretched in a direction substantially axially thereof and that forming the bottom of said pocket being stretched radially in all directions from its center, the grain fibers of said material adjacent the surfaces thereof extending substantially parallel to each other and to the respective surfaces.

2. A steel spring shackle side link comprising an elongated body and, adjacent each of its ends, continuous walls extruded from the plane of and integral with said body respectively defining a conical pocket extending entirely through the body and for an appreciable distance therebeyond with the grain fibers forming the surfaces of the inner walls of the pocket extending substantially parallel to said surfaces, the outer surface of that part of each of said walls defining the bottom of the adjacent pocket lying at a distance from the adjacent surface of the body approximating the thickness of the latter, the material in said bottom being compacted and radially stretched in all directions from its center.

3. A steel spring shackle side link comprising an elongated flat body having a pocket adjacent each of its ends formed of material integral with the body stretched in a direction substantially transverse to the plane thereof with the grain fibers forming the surfaces of the stretched material extending substantially parallel to each other in said surfaces, the bottom of said pocket being bounded by a continuous wall intergral with the body, of approximately one-half the thickness thereof and extending substantially parallel thereto, the material in said wall being under stress radially in all directions from the center of the bottom.

4. A steel spring shackle side link comprising a substantially flat body having an integral frustoconical projection adjacent each of its ends, the material in the conical portion of each of said projections being under stress in a direction substantially parallel to the axis thereof with its grain fibers extending substantially parallel to the respectively adjacent surfaces of the conical portion and that in the bottom thereof being under stress in all directions radially from its center.

WILLIAM A. TRYON.